United States Patent
Baker

(10) Patent No.: US 10,032,323 B2
(45) Date of Patent: *Jul. 24, 2018

(54) ROTARY POWER TRANSMISSION JOINT WITH AN INTEGRATED WIRELESS SENSOR

(71) Applicant: Douglas M. Baker, Ypsilanti, MI (US)

(72) Inventor: Douglas M. Baker, Ypsilanti, MI (US)

(*) Notice: Subject to any disclaimer, the term of this patent is extended or adjusted under 35 U.S.C. 154(b) by 214 days.

This patent is subject to a terminal disclaimer.

(21) Appl. No.: 14/825,239

(22) Filed: Aug. 13, 2015

(65) Prior Publication Data

US 2016/0005246 A1   Jan. 7, 2016

Related U.S. Application Data

(63) Continuation-in-part of application No. 14/029,742, filed on Sep. 17, 2013, now Pat. No. 9,132,838.

(60) Provisional application No. 61/701,893, filed on Sep. 17, 2012.

(51) Int. Cl.
| | |
|---|---|
| *B60W 10/26* | (2006.01) |
| *G07C 5/08* | (2006.01) |
| *H02K 7/18* | (2006.01) |
| *B60W 40/13* | (2012.01) |

(52) U.S. Cl.
CPC ........... *G07C 5/0841* (2013.01); *B60W 40/13* (2013.01); *H02K 7/1807* (2013.01); *B60W 2510/105* (2013.01); *B60W 2510/107* (2013.01); *B60Y 2300/207* (2013.01); *B60Y 2400/307* (2013.01); *B60Y 2400/3044* (2013.01)

(58) Field of Classification Search
CPC ............. B60W 10/26; B60W 2420/10; B60W 2420/22; B60W 2422/00; G07C 5/0841
See application file for complete search history.

(56) References Cited

U.S. PATENT DOCUMENTS

| | | |
|---|---|---|
| 4,838,077 A | 6/1989 | Shifflet et al. |
| 5,736,938 A | 4/1998 | Ruthroff |
| 5,801,644 A | 9/1998 | Ruthroff |
| 5,837,909 A | 11/1998 | Bill et al. |
| 6,191,687 B1 | 2/2001 | Dlugos et al. |
| 6,259,372 B1 | 7/2001 | Taranowski et al. |
| 6,304,176 B1 | 10/2001 | Discenzo |
| 6,632,252 B1 | 10/2003 | Kyrtsos |
| 7,081,693 B2 | 7/2006 | Hamel et al. |
| 7,170,201 B2 | 1/2007 | Hamel et al. |
| 7,256,505 B2 | 8/2007 | Arms et al. |

(Continued)

FOREIGN PATENT DOCUMENTS

| | | |
|---|---|---|
| EP | 1022702 A2 | 7/2000 |
| EP | 2237004 A1 | 6/2010 |

*Primary Examiner* — Edwin A Young
(74) *Attorney, Agent, or Firm* — John S. Artz; Dickinson Wright PLLC

(57) ABSTRACT

The aspects of the present disclosure provide an assembly for acquiring operational data from a machine including a power generating device and a rotating component interconnected with the power generating device for transmitting power from the power generating device. The assembly may include a sensor assembly having a-sensor being interconnected to the rotating component for sensing operational data of the machine and a microprocessor communicatively connected to the sensor for receiving and interpreting the operational data sensed by the sensor.

21 Claims, 8 Drawing Sheets

(56) References Cited

U.S. PATENT DOCUMENTS

| | | |
|---|---|---|
| 7,256,695 B2 | 8/2007 | Hamel et al. |
| 7,361,998 B2 | 4/2008 | Hamel et al. |
| 7,365,455 B2 | 4/2008 | Hamel et al. |
| 7,429,805 B2 | 9/2008 | Hamel et al. |
| 7,612,665 B2 | 11/2009 | Okada et al. |
| 7,698,959 B2 | 4/2010 | Raymond et al. |
| 8,011,255 B2 | 9/2011 | Arms et al. |
| 9,132,838 B2 * | 9/2015 | Baker .................. B60W 40/13 |
| 2009/0228166 A1 * | 9/2009 | Durkos ................ G05D 1/0219 |
| | | 701/26 |

* cited by examiner

ROTARY POWER TRANSMISSION JOINT WITH AN INTEGRATED WIRELESS SENSOR

CROSS REFERENCE TO RELATED APPLICATION

This application is a continuation-in-put and claims the benefit of application Ser. No. 61/701,893 filed Sep. 17, 2012, and application serial number of Ser. No. 14/029,742 filed Sep. 17, 2013, which is hereby incorporated by reference as though set forth fully herein.

FIELD OF THE DISCLOSURE

The present disclosure relates generally to an assembly for acquiring operational data from a machine including a power generating device and a rotating component interconnected with the power generating device for transmitting power for the power generating device and a sensor assembly.

BACKGROUND OF THE DISCLOSURE

Assemblies for acquiring operational data from a machine including a power generating device and a rotating component interconnected with the power generating device for transmitting power from the power generating device are generally known in the art, especially in the field of vehicles using engines to generate power. One such Assembly is disclosed in U.S. Pat. No. 6,632,252 to Christos T. Kyrtsos, which includes a sensor assembly for being interconnected with a vehicle for transmitting temperature data. The sensor assembly includes an energy harvesting assembly for harvesting ambient energy using an inductive configuration for powering the sensor assembly.

There remains a need for improvements in such assemblies to wirelessly monitor additional types of operational data to improve operation of such machines. With regard to vehicles, there remains a need for improvements that lead to increased fuel economy and longer vehicle life. Further, there remains a need for more compact wireless assemblies that have components that are protected from ambient forces.

SUMMARY OF THE DISCLOSURE

The aspects of the present disclosure provide an assembly for acquiring operational data from a machine using a sensor assembly.

An aspect of an assembly for acquiring operational data from a machine may include a power generating device and a rotating component interconnected with the power generating device for transmitting power from the power generating device. The assembly may also include a sensor assembly being interconnected with the rotating component for sensing the operational data of the machine. The wireless sensor assembly may include a sensor for measuring the operational data of the rotating component and a microprocessor for receiving and interpreting the operational data.

The aspects of the present disclosure provide various advantages. For example, a sensor assembly that can be incorporated into a rotating component of a machine to monitor operational data such as torque, RPM's, horsepower, acceleration, temperature, pressure, and strain. The sensor assembly does not need to connect to the primary battery of the machine. Further, the disclosure provides for a pre-calibrated torque joint instrument that can be built and readily installed in shaft power applications without the need for system calibration of strain rate after installation. Furthermore, the disclosure provides for a sensor assembly that is protected from external forces. Additionally, the disclosure provides for real time corrected horsepower of the power generating component through measured horsepower transmitted through the rotating component, by means of air density measurements taken through the sensor assembly. In addition, the disclosure provides for early detection and failure detection of the rotating part.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teaching of the present disclosure may be desired for particular applications or implementations.

The aspects provided herein may include an assembly for acquiring operational data from a machine with a power generating device and a rotating component interconnected with the power generating device for transmitting power from the power generating device. The assembly may also include a sensor assembly being interconnected with the rotating component for sensing the operational data of the machine in relative motion. The sensor assembly may include a sensor for measuring the operational data of the rotating component in relative motion and a microprocessor for receiving and interpreting the operational data from at least the sensor.

The sensor assembly can be used within engine controls and can be installed on various locations along the driveline. For example, the sensor assembly may be located along an output shaft of an internal combustion engine. The sensor assembly may be powered from inductive coupling through magnetic pick-ups for speed sensing. The sensor assembly may wirelessly transmit to a base system, which can use the magnetic pick-ups for antenna placement. The sensor assembly may employ event-base (encoder) triggering and may further obtain clock signs from encoder magnetic flux transients. The sensor assembly may process output control signals and may enable closed loop control of global torque structures.

Figure 4:
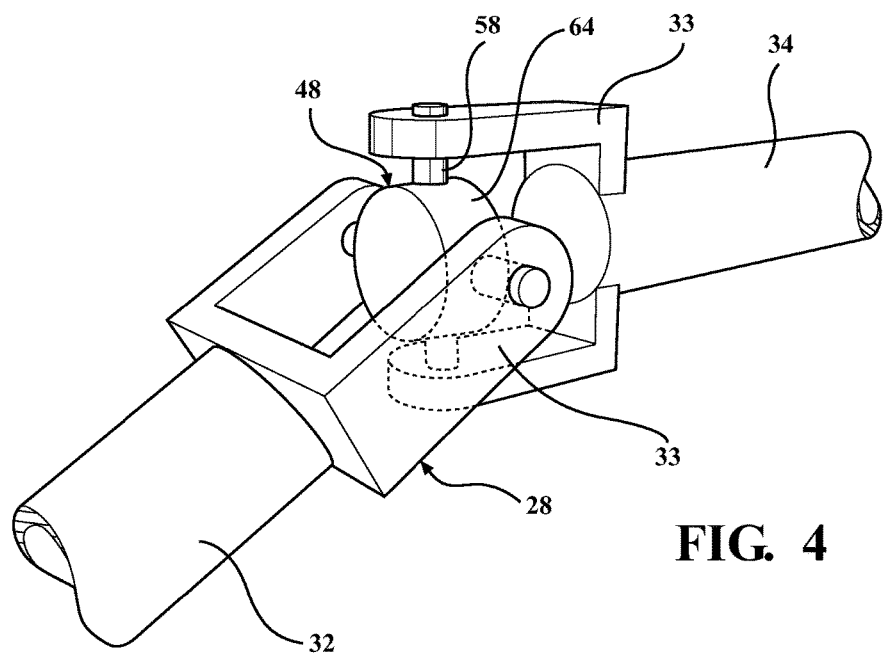
FIG. 4 is a perspective view of a Cardan universal joint in accordance with an aspect of the present disclosure.
Figure 5:
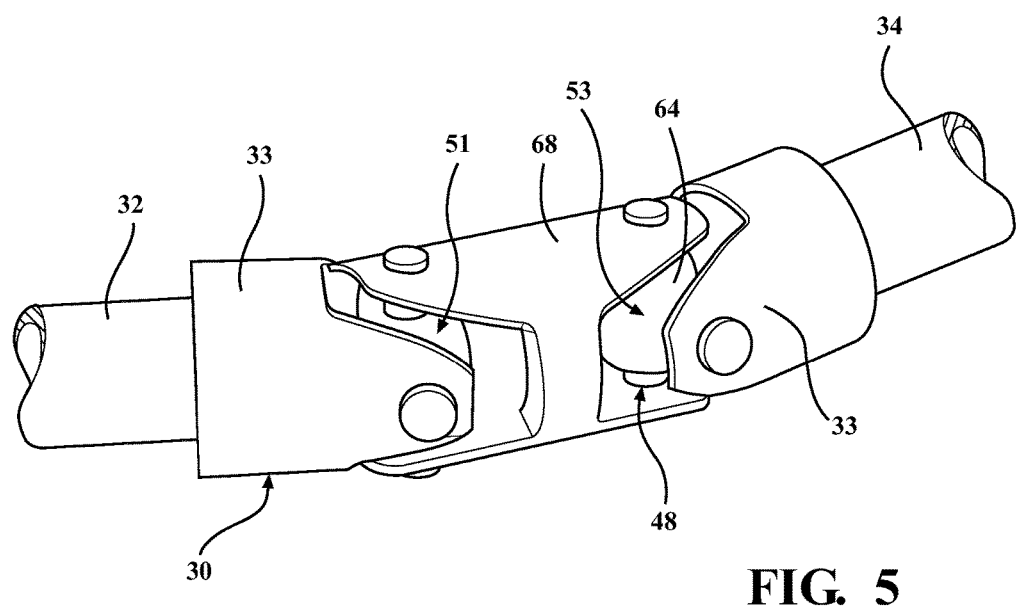
FIG. 5 is a perspective view of a double Cardan universal joint in accordance with an aspect of the present disclosure.

Referring to the Figures, wherein like numerals indicate corresponding parts throughout the several views, an assembly 20 is generally shown for acquiring operational data such as, but is not limited to, position, . . . torque, acceleration, temperature and pressure from a machine that includes power generating device 22 and a rotating component, such as but is not limited to, a driveshaft 24, driveshaft yoke, Cardan universal joints 28 (U joints), as best presented in FIG. 4, a double Cardan universal joints 30, as best presented in FIG. 5, a transmission joint, a gear, a half shaft, or a prop shaft to determine operational data such as speed, acceleration, torque, horsepower, rotational position, strain, and vibration due to imbalance. In one aspect, the assembly 20 is used with a vehicle or machine that includes an engine or a power generating device, but it should be appreciated that the assembly could be used with other machines such as, but is not limited to turbines, pumps or pulleys, with other types of power generating devices.

Figure 1:
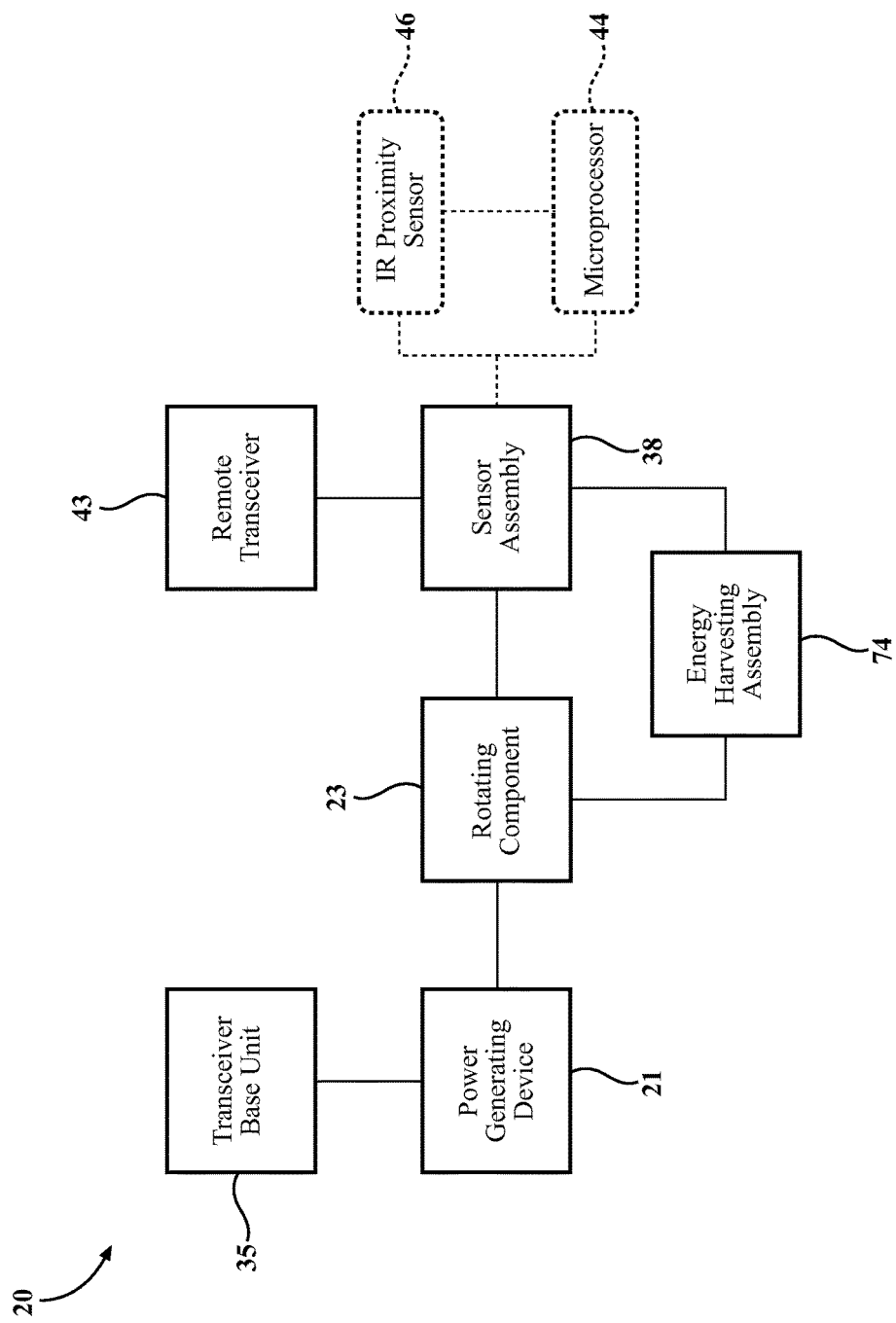
FIG. 1 is a block diagram of one aspect of an assembly for acquiring operational data from a machine may include a power generating device and a rotating component interconnected with the power generating device for transmitting power from the power generating device in accordance with the present disclosure.

According to an aspect of the present disclosure, as shown by FIG. 1, an assembly 20 for acquiring operational data from a machine including a power generating device 21 and a rotating component 23 interconnected with the power generating device for transmitting power from the power generating device 21 may include a sensor assembly 38. The sensor assembly 38 may have a sensor 46 interconnected to the rotating component 23 for sensing operational data of the machine in relative motion. The sensor 46 may be an infrared (IR) proximity sensor, an accelerometer, a gyroscope, a magnetometer, or another type of sensor configured to sense operational data of the machine in relative motion. The sensor assembly may also include a microprocessor 44 communicatively connected to the sensor 46 for receiving and interpreting the operational data sensed by the sensor 46 as well as for controlling the sensor 46. The operational data sensed by the sensor assembly 38 may include one or more of speed, horsepower, rotational position or speed, torque, acceleration, temperature, pressure, and strain of the rotating component of the machine in relative motion. In other words, the sensor 46 may be interconnected with or imbedded on a rotating component to sense operational data. The rotating component may be one of a driveshaft, driveshaft yoke, a Cardan universal joint, a double Cardan universal joint, a transmission joint, a gear, a half shaft, or a prop shaft. According to one aspect of the present disclosure, the assembly 20 may further include a transceiver base unit 35 interconnected with the power generating device 21. The transceiver base unit 35 may be in wireless communication with the sensor assembly 38 and may receive the operation data from the sensor assembly and sends instructions to the sensor assembly 38 to change the preferred mode of operation of the sensor assembly 38. A remote transceiver 43 may be in wireless communication with and may transmit data to the transceiver base unit 35. The assembly 20 may further include an energy harvesting assembly 74. The energy harvesting assembly 74 may be interconnected with the rotating component 23 and the sensor assembly 38 for harvesting energy from the rotating component to provide power to the sensor assembly. The energy harvesting assembly 74 may be an inductive harvesting assembly having an inductive ring for generating energy from the rotating component to provide power to the sensor assembly.

Figure 2:
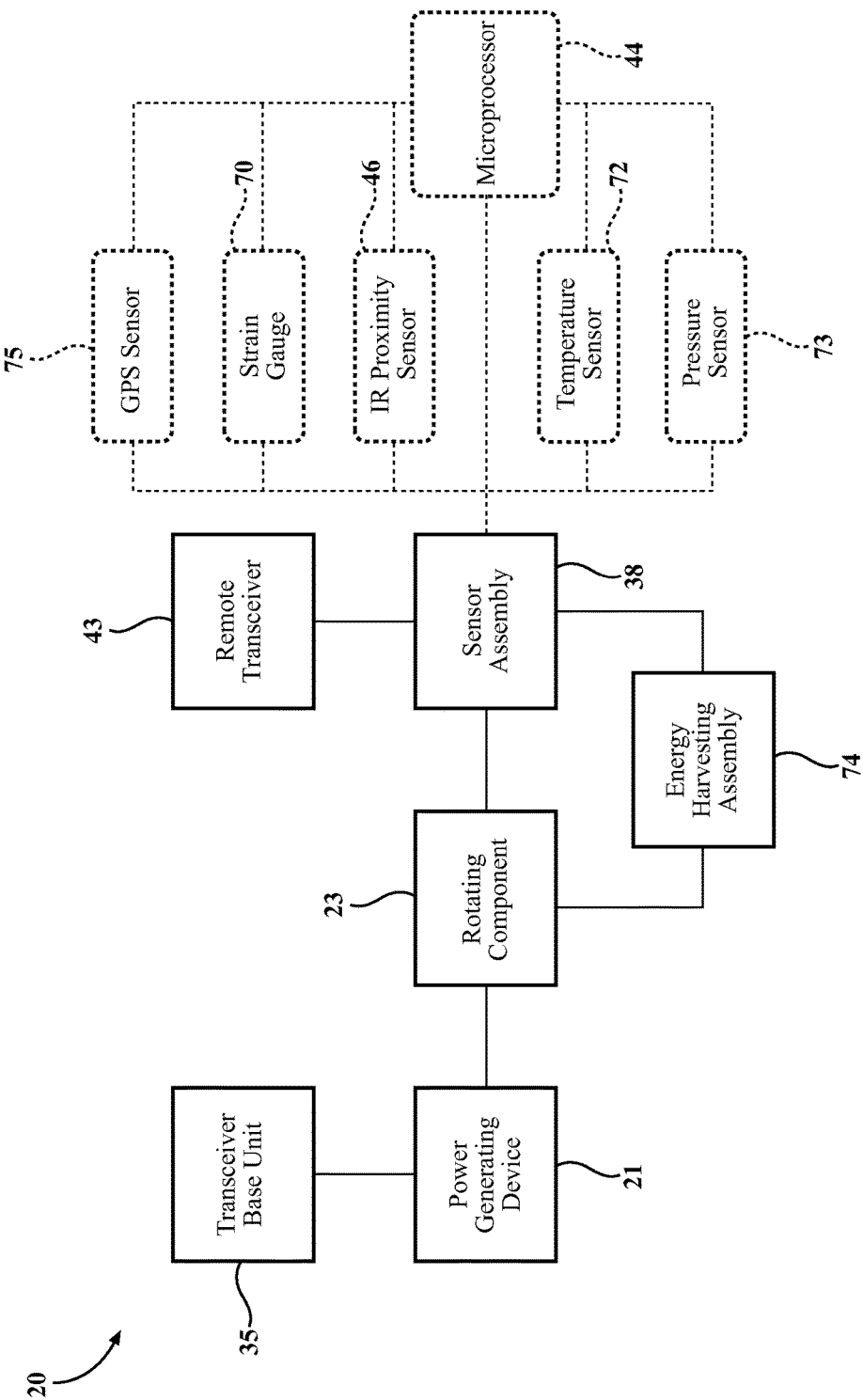
FIG. 2 is a block diagram of another aspect of an assembly for acquiring operational data from a machine may include a power generating device and a rotating component interconnected with the power generating device for transmitting power from the power generating device in accordance with the present disclosure.
Figure 3:
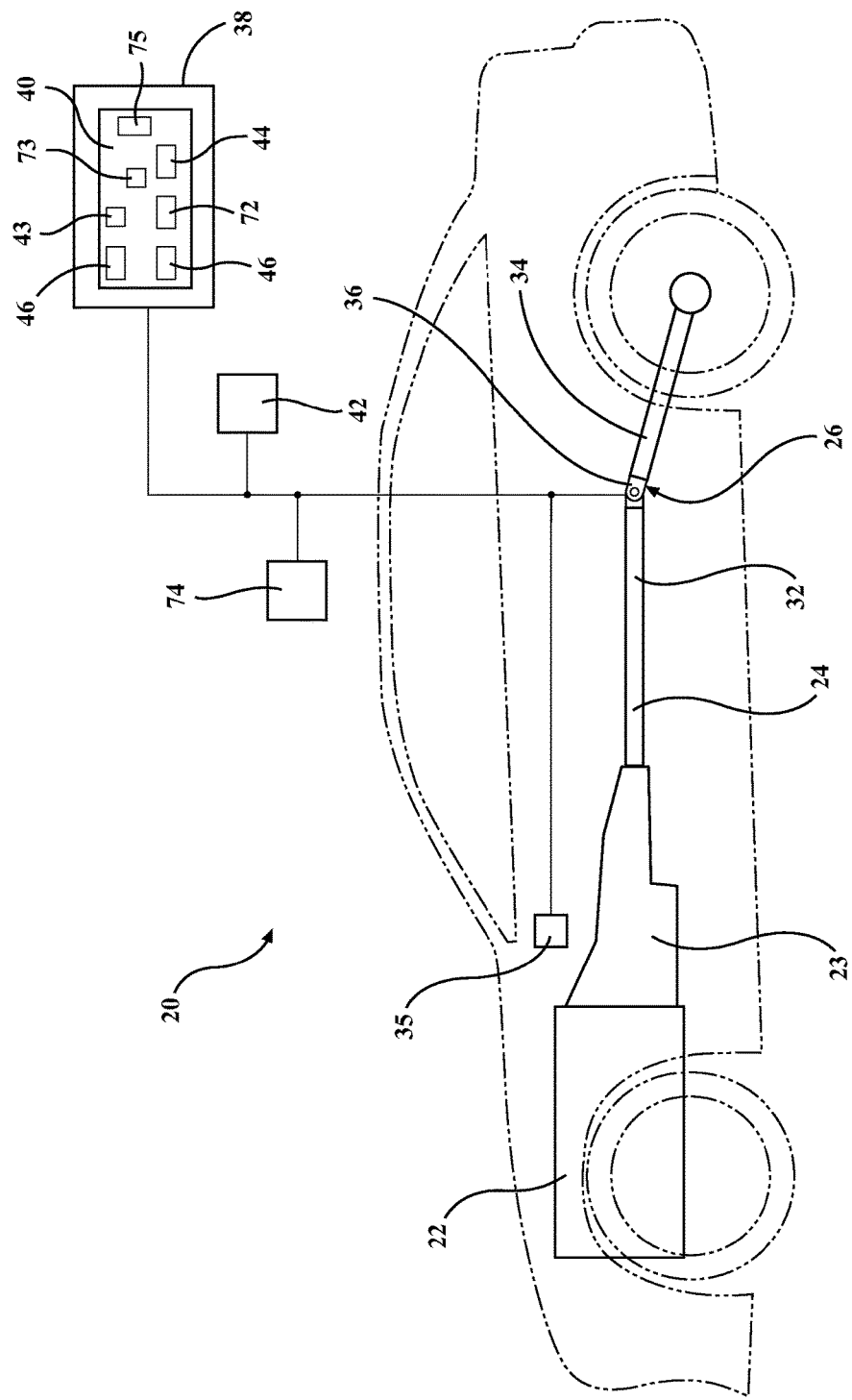
FIG. 3 is a schematic of an assembly for acquiring operational data from a machine may include a power generating device and a rotating component interconnected with the power generating device for transmitting power from the power generating device in accordance with an aspect of the present disclosure.

In one aspect of the present disclosure, the machine may be a vehicle, as best shown in FIGS. 2 and 3, and the power generating device 21 can be an engine 22. In a further aspect, the rotating component 23 may include a joint 26, such as a Cardan universal joint or a double Cardan universal joint. Alternatively, the rotating component 23 may be a gear, a half shaft, a prop shaft, a driveshaft, or a driveshaft yoke. Additionally, according to an aspect, the sensor 46 may sense or measure the operational, which may include one or more of speed, horsepower, rotational position, torque, acceleration, temperature, pressure, and strain experienced by the joint 26 and/or the vehicle. In an alternative aspect, the sensor assembly 38 may include a IR proximity sensor 46 to measure rotational speed of the rotating component 23 or the joint 26 or a magnetometer to measure the strength or direction of the magnetic field provided by the rotating component, one or more temperature sensors 72 to measure the temperature of the rotating component 23 or the joint 26, one or more pressure sensors 73 to measure the fluid pressure adjacent to the joint, one or more strain gauges for detecting the strain on the rotating component 23 or joint 26, and one or more global positioning system (PPS) sensors 75 for collecting speed and location data of the vehicle. As discussed above, the sensor assembly 38 includes a microprocessor 44, which may communicate with each sensor of the sensor assembly 38 and may obtain data from each. The sensor assembly 38 may be integrated into a flexible circuit for low profile installation and connection to the joint 26 or rotating component 23.

Figure 6:
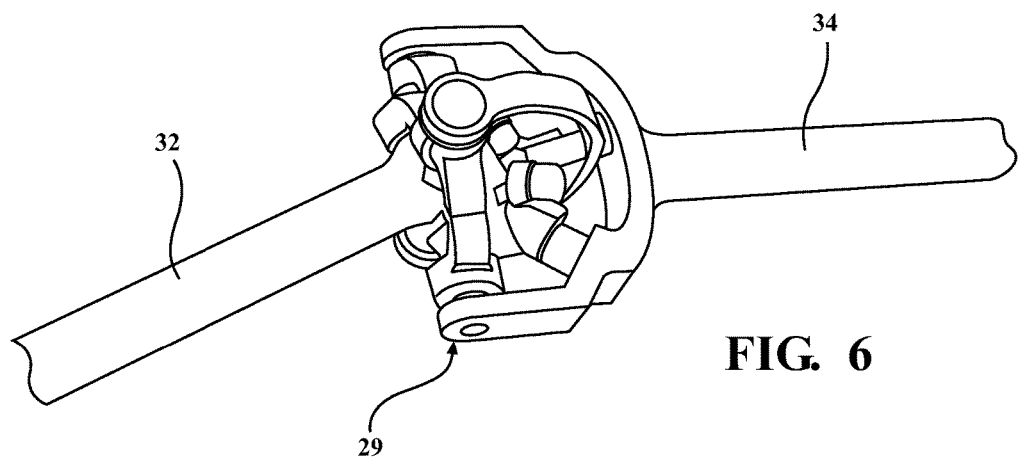
FIG. 6 is a perspective view of a Thompson constant velocity joint in accordance with an aspect of the present disclosure.
Figure 7:
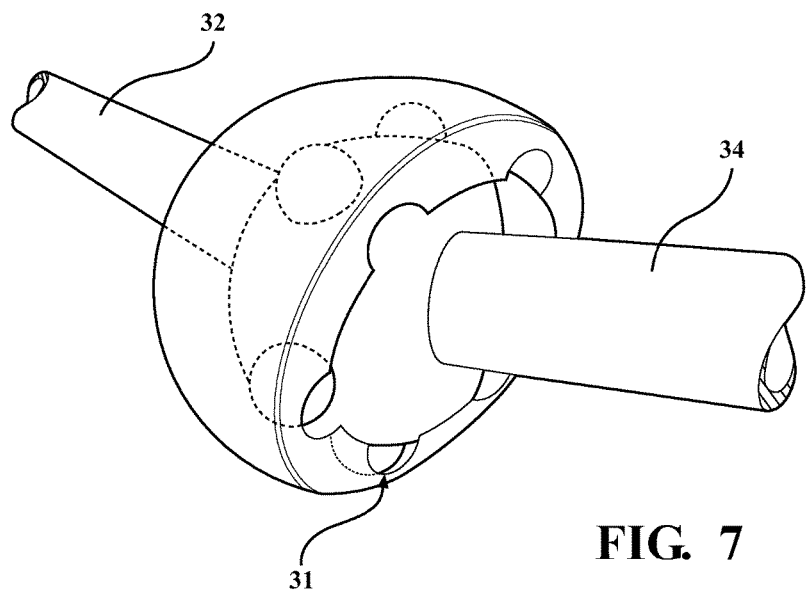
FIG. 7 is a perspective view of a Rzeppa constant velocity joint in accordance with an aspect of the present disclosure.

According to another aspect, the assembly 20 acquires data from a joint 26 that transmits rotational movement from the transmission 23 to the driveshaft 24 and from the driveshaft 24 to the rear transaxle at an angle. Typical rear wheel drive applications with two or more such joints 26 between the transmission output and the rear differential. In an aspect of the present disclosure, the joint 26 is a Cardan universal joint 28, as best presented in FIG. 4, and a double Cardan universal joint 30, as best presented in FIG. 5. It should be appreciated that in power transmission applications, other joints 26 could be used, such as but not limited to, a Thompson constant velocity joint 29, as best presented in FIG. 6, or a Rzeppa constant velocity joint 36, as best presented in FIG. 7. Further it, should be appreciated that the assembly 20 could acquire data from other rotating components of the vehicle such as, but not limited to, a driveshaft 24 or driveshaft yoke.

The joint 26 includes an input shaft and an output shaft 34 and a joining component 36 for interconnecting the input and output shafts. In an aspect of the disclosure, the joint 26 includes a generally cylindrical shaped input shaft 32 for being interconnected with the engine 22, through a transmission 23, and a generally cylindrical shaped output shaft 34 for being interconnected with the driveshaft 24 of the vehicle, and a joining component 36 for interconnecting the input shaft 32 and the output shaft 34 and for providing for pivotable movement between the input and output shafts 32, 34. It should be appreciated that the input and output shafts 32, 34 could have other cross-sectional shapes such as, but not limited to, a square cross section.

A sensor assembly 38 is interconnected with the rotating part of the machine for acquiring the operational data of the machine. In an aspect of the present disclosure, the sensor assembly 38 is interconnected with the joint 26 for acquiring the operational data of the vehicle. It should be appreciated that the sensor assembly 38 could alternatively be attached to other rotating components of the vehicle such as, but is not limited to the driveshaft 24 or driveshaft yoke. Further, a transceiver base unit 35 is wirelessly connected with the sensor assembly 38 for receiving the operational data from the sensor assembly 38 and for sending instructions to the sensor assembly 38 to change the preferred mode of operation of the sensor assembly 38 and/or vehicle. The sensor assembly 38 includes a remote transceiver 43 for sending data and receiving instructions from the transceiver base unit 35. In an aspect of the present disclosure, the transceiver base unit 35 is interconnected with the vehicle in an accessible location to operators; however, it should be appreciated that the transceiver base unit could be positioned at any location depending on the application of the sensor assembly 38.

Data from the remote transceiver 43 is wirelessly transmitted (typically in the 2.45 Ghz range) to the transceiver base unit 35 that receives the digital signal and passes it on to either digital via USB, SPI, two-wire, or USART or other form of digital outputs, or converts it back to analog signals for analog outputs. Commands can be sent from the transceiver base unit 35 to the remote transceiver 43 to setup active data channels, set data rates, change transmission channel and various other operating characteristics. It should be appreciated that the transceiver base unit 35 and remote transceiver 43 could communicate with each other in others ways such as, but not limited to, a Bluetooth connection or another type of known communication.

The sensor assembly 38 includes a circuit board 40 that is interconnected with the joint 26. It should be appreciated that the circuit board 40 could be interconnected with the joint in various ways such as, but not limited to, an adhesive or nuts and bolts. In an aspect of the disclosure, the circuit board 40 generally has a rectangular shape and defines a front face. It should be appreciated that the circuit board 40 could have various shapes, ideally to match a portion of the joint 26 which it is being connected to. A rechargeable battery 42 is interconnected with the joint 26 and is electrically connected with the sensor assembly 38 for providing electric power to the sensor assembly 38. The circuit board 40 further includes a microprocessor 44 that is electrically connected with the sensor assembly 38 and transceiver 43 for receiving and interpreting the operational data from the sensor assembly 38 and rotating component and for directing the electric power from the battery 42 to the sensor assembly 38. It should be appreciated that the transceiver 43 could be positioned on the circuit board 40, or disposed at another location. It should be appreciated that a universal Cardan joint 28 is a good location for installation of such a sensor assembly 38 as the sensor can be mounted perpendicular to and centered with to the rotation axis, thus, eliminating inertial loads and imbalance due to the sensor weight.

The sensor assembly 38 may also include one or more sensors 46 for measuring the operational data of the rotating, component. In particular, the sensor 46 may be a Micro-electro mechanical system (MEMs) IR proximity sensor. Alternatively, the sensor 46 may be a magnetometer for sensing the strength or direction of the magnetic field produced by rotating components in relative motion. Further, the sensors 46 may be a combination of different sensors for measuring operational data of the rotating component. In one aspect of the present disclosure, the operational data may include at least one of rotational position, speed, torque, strain, vibrations, temperature, or pressure of the rotating component. In an aspect of the disclosure, the sensor 46 may be interconnected with the circuit board 40. It should be appreciated that different types, or any number of sensor 46 or any proximity sensor could be used, and they could be disposed at various locations on the rotating component of the automobile. According to one aspect, the circuit board 40 is placed such that the face of the circuit board 40 extends perpendicular to the axis A of rotation, such that the sensor 46 is positioned on the circuit board 40 to negate inertial acceleration of the rotating component of the vehicle in order to determine one of rotational speed, rotational angle, angular accelerations, and radial disturbances. Further, the sensor 46 is positioned adjacent to the radial center of the joint 26, at its axis of rotation, in order to keep the radially oriented axes of the sensor 46 from saturating at high engine 22 speeds due to the inertial forces. For example, at ¼" radius, a shaft rotating at 8000 rpm will generate 455 Cs in the radial direction. The maximum allowable rotational speed for which the device can produce useful radial acceleration data can therefore be determined based on the radial placement of the accelerometer 46 on the circuit board 40. Accordingly, it should be appreciated that the circuit board 40 is positioned such that its face extends perpendicular to the axis A of rotation, and the sensor 46 may be positioned radially adjacent to the axis A.

According to one aspect of the disclosure, the rotating component of the vehicle may be a universal Cardan joint 28, the signal from the sensor 46 can determine an axial alignment angle between the input and output shafts 32, 34. Furthermore, the signal can be used to determine axial inclination by considering the Direct Current (DC) component of the axially-aligned axis. Accuracy is improved over a wide range of radial acceleration (i.e., shaft rotational speed) as the remote is capable of digitally changing the range of the sensors 46 dynamically to best resolve the instantaneous magnitude of radial acceleration.

Angular shaft accelerations/decelerations result from changes in input torque and/or output load and from changes in upstream and/or downstream inertial loads applied to the driveshaft 24. During positive torque events (i.e., input torque exceeds output torque), torque and angular acceleration sensor measurements can be acquired to determine downstream inertia loads from the sensor assembly 38. For example, in the vehicle, the downstream inertial loads result from the rear differential, wheels, and road load which can vary with vehicle weight and payload, vehicle inclination, wheel traction, etc. During negative torque events, torque and angular acceleration can be used to determine upstream inertial loads. In another example, the upstream inertial loads are affected by the operating characteristics of the transmission, clutch and engine 22 which can vary with gear changes, clutch engagement, cylinder fuel/air management, engine accessory loads, etc.

Figure 9:
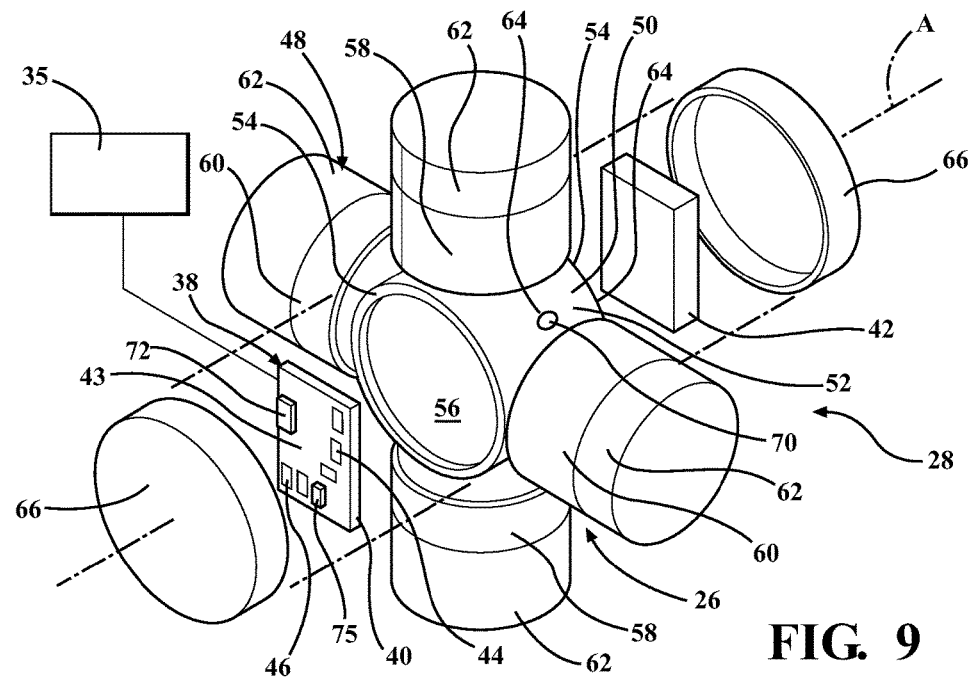
FIG. 9 is a perspective exploded view of the body of a universal Cardan joint and sensor assembly in accordance with an aspect of the present disclosure.

As best presented in FIG. 9, an aspect of the present disclosure includes the joint 26 is a universal Cardan joint 28, the universal Cardan joint 28 includes a body 48 that has a generally cross shape that includes a central tube 50 that has a generally tubular shape and extends along an axis A of rotation, and defines an outer wall 52 that extends between a pair of ends 54 and defines a cavity 56 therein. The body 48 further includes a pair of input trunnions 58 that extend from opposing sides of the outer wall 52 of the central tube 50 in alignment with one another, and a pair of output trunnions 60 that extend perpendicularly to the input trunnions 58 on opposing sides of the outer wall 52 of the central tube 50. A bearing cap 62 is disposed about each of the input and output trunnions 58, 60 for rotating about the trunnions 58, 60. The outer wall 52 of the central tube 50 defines four corner segments 64, each between one of the input trunnions 58 and one of the output trunnions 60.

When the sensor 46 is aligned with the input trunnions 58 (constant velocity) or output trunnion 60 (oscillating velocity) of the joint 26, a frequency at twice the rotational frequency of the input shaft 32 will be superimposed on the rotational frequency signature with an amplitude proportional to the angle between the input and output shafts 32, 34 as the output shaft 34 cyclically accelerates and decelerates through two cycles every revolution. The amplitude can be used to dynamically determine the relative shaft angle between the input and output shafts 32, 34. It should be appreciated that due to the oscillatory nature of the joint 26, when implemented with a non-zero angle between input and output shafts 32, 34, provides adequate acceleration to detect rotational speeds in either horizontal or vertical shaft orientations.

In an aspect of the present disclosure, as best presented in FIG. 9, the circuit board 40 is disposed in the cavity 56 of the central tube 50. The battery 42 is also disposed in the cavity 56 of the central tube 50 adjacent to the circuit board 40. An end cap 66 removably seals each of the ends 54 of the central tube 50 for sealing the cavity 56 and housing the pin bearings. It should be appreciated that the circuit board 40 and battery 42 could be positioned at other locations of the rotating component.

It should be appreciated that sealing the circuit board 40 and battery 42 in the cavity 56 advantageously protects the circuitry from harsh environmental conditions and minimizes inertial load imbalance resulting from the system installation.

In an aspect of the present disclosure, the bearing caps 62 of the input trunnions 58 are interconnected with the input shaft 32 through a U-shaped trunnion yoke 33 for rotating with the input shaft 32. Further, the bearing caps 62 of the output trunnions 60 are interconnected with the output shaft 34 for rotating with the output shaft 34.

In another aspect of the present disclosure, as best presented in FIG. 5, the joint 26 is a double Cardan universal joint 30, which includes a first body 51 and a second body 53. The bearing caps 62 of the input trunnions 58 of the first body 48 are interconnected with the input shaft 32 for rotating with the input shaft 32. The bearing caps 62 of the output trunnions 60 of the second body 48 are interconnected with the output shaft 34 for rotating with the output shaft 34. Further, a connection cylinder 68 that has a generally cylindrical shape is interconnected with the output trunnions 60 of the first body 48 and the input trunnions 58 of the second body 48 for transferring rotational movement from the first body 48 to the second body 48 to spin the output shaft 34 at the same constant velocity as the input shaft 32. It should be appreciated that the connection cylinder 68 could have other cross-sectional shapes such as, but not limited to, a square cross-section.

Figure 8:
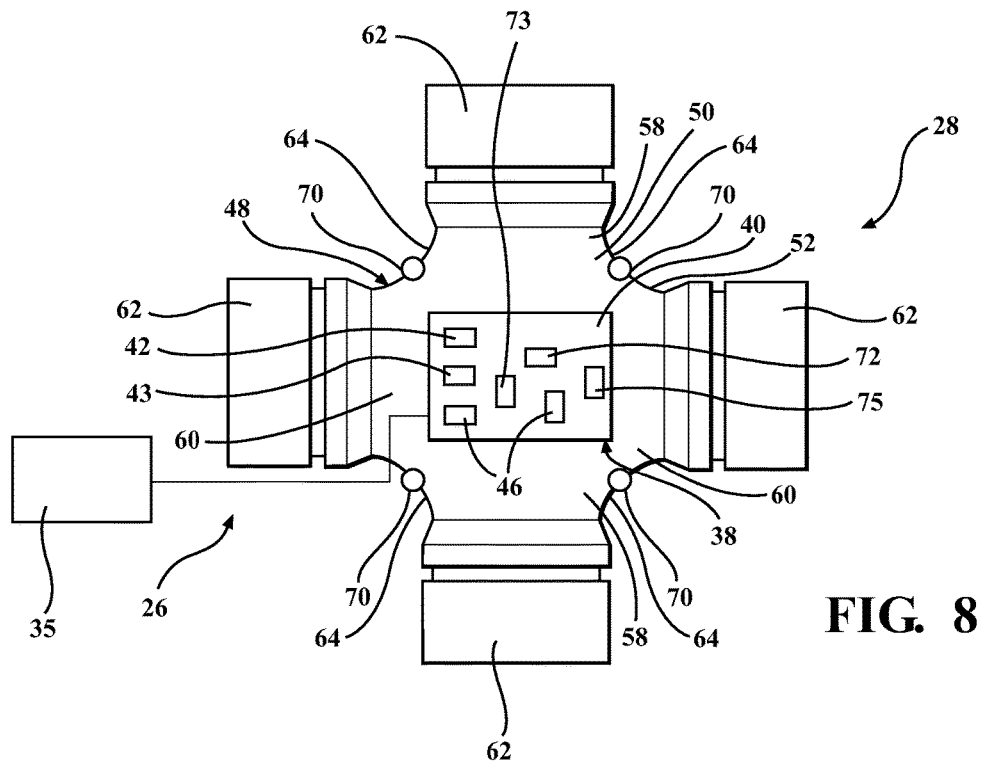
FIG. 8 is a side view of a body of a universal Cardan joint with a schematic of the sensor assembly in accordance with an aspect of the present disclosure.

As best presented in FIG. 8, the sensor assembly 38 further includes at least one strain gauge 70 for detecting the strain on the joint 26. In an aspect of the present disclosure, a strain gauge 70 is disposed on each of the corner segments 64 for detecting the strain at each of the corner segments 64 for optimal placement in a peak strain location. Opposite diagonal strain gauges 70 experience similar compressive/tensile forces. The strain gauges 70 form the four quadrants of a full Wheatstone bridge circuit. It should further be appreciated that inherent compressive and tensile forces in each quadrant of the joint provide optimal compressive/tensile strain fields for subsequent strain gauge 70 based measurements. In one aspect of the circuit board 40, the strain gauges 70 can be directly integrated into the four corners of a flexible circuit board 40 to eliminate wiring, facilitate accurate placement, and reduce the complexity of installation. The entire circuit board 40 with integrated gauges could be adhesively mounted to the u-joint surface in a single operation. It should be appreciated that the strain gauge 70 could be positioned at various other locations on the rotating component such as, but not limited to, trunnion yolk 33.

It should be appreciated that the strain gauge 70 components can advantageously be pre-installed on a U-joint and readily installed in a power transmission application without the need for system calibration of strain rate after installation.

The integrated sensor assembly 38 is capable of transmitting high-speed signals directly to a stationary base unit 35, or integrating high speed signals and calculated parameters on-board over a number of rotational events and subsequently performing lower speed transmission of calculated and averaged values. Re-transmission and AES encryption algorithms can be used to assure that data transfer is reliable and safe.

The sensor assembly 38 further includes at least one temperature sensor 72 for measuring the temperature of the rotating component. In an aspect of the present disclosure, the temperature sensor 72 is interconnected with the joint 26. It should be appreciated that any type of temperature sensor 72 could be used such as, but not limited to, thermocouples, and resistance thermometers. It should be appreciated that readings from the temperature sensor 72 can be used to detect early signs of performance degradation and potential failure of the driveshaft 24 or other rotating components.

Temperature sensors 72 placed near each of the trunnions 58, 60 on the back side of the circuit board 40 can directly measure significant thermal gradients between trunnions 58, 60, thus, indicating a potential failure of the roller pin bearings within a specific bearing cap 62.

The sensor assembly 38 further includes at least one pressure sensor 73 for measuring the fluid pressure adjacent to the joint 26. It should be appreciated that depending on the application of the assembly 20, the pressure sensor 73 can measure the pressure of any fluid such as, but not limited to, air, water, lubricants, and hydraulic fluid. It should further be appreciated that on-board air density measurements, via the temperature and pressure sensors 72, 73, provide real time corrected horsepower from measured actual horsepower.

The sensor assembly further includes a global positioning system (UPS) sensor 75 for detecting speed and location data of the vehicle. It should be appreciated that the speed and location data can be used in conjunction with other operational data collected by the sensor assembly 75. For example the GPS data could pinpoint what speed the vehicle was traveling at and the specific location the vehicle was located at during a particular event. It should be appreciated that the UPS sensor 75 could be positioned on the circuit board 40 or any other location of the vehicle and rotating component.

An energy harvesting assembly 74 is interconnected with the joint 26 and is electrically connected with the battery 42 and the sensor assembly 38 for harvesting energy from the joint 26 to provide electric power to the sensor assembly 38 and the battery 42 for charging the battery 42. It should be appreciated that the energy harvesting assembly 74 can provide a continuous power supply for the sensor assembly 38.

Figure 10:
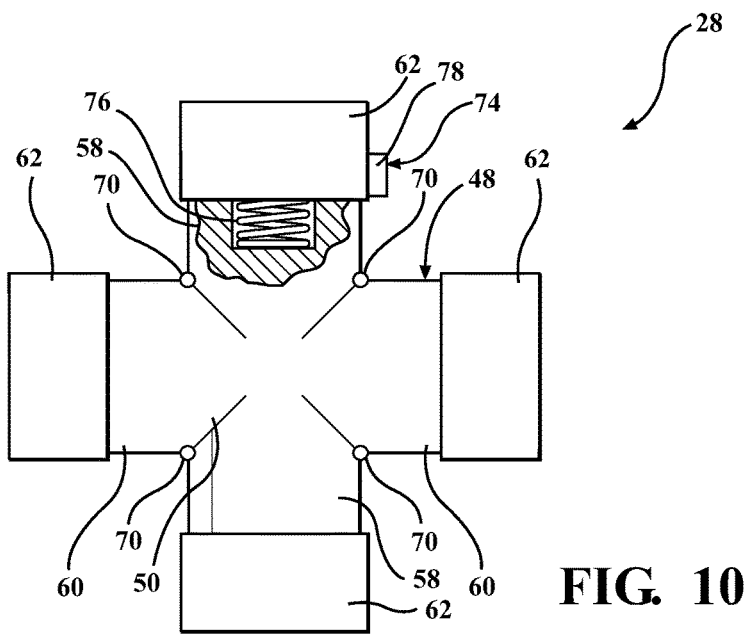
FIG. 10 is a side view of a body of a universal Cardan joint with an energy harvesting assembly in accordance with an aspect of the present disclosure.
Figure 11:
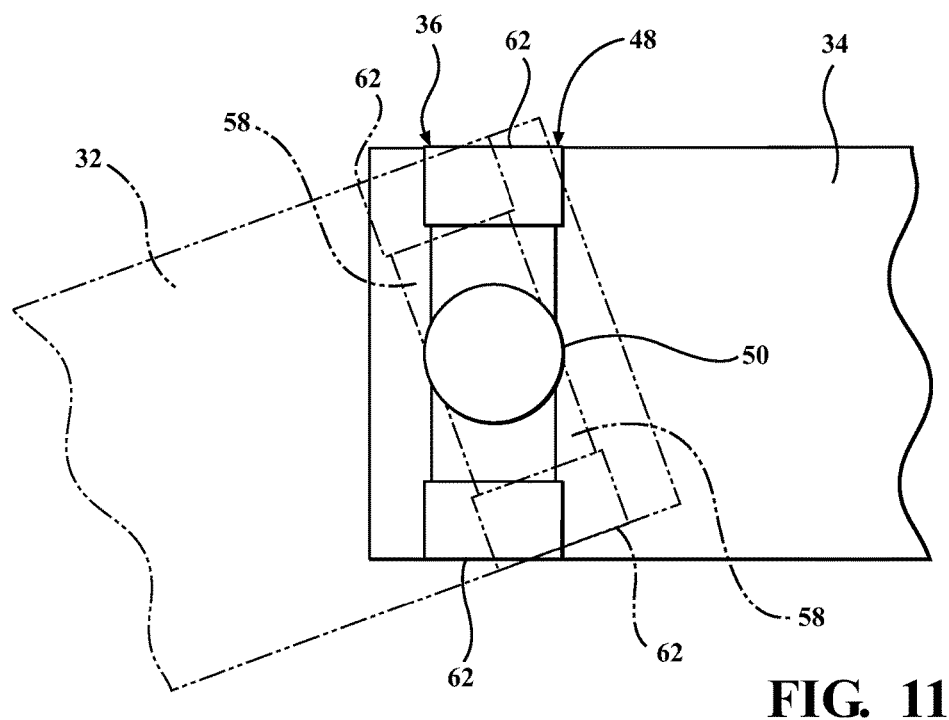
FIG. 11 is a side view of a universal Cardan joint with input and output shafts in accordance with an aspect of the present disclosure.

As best presented in FIG. 10, in an aspect of the disclosure, the energy harvesting assembly 74 is an inductive harvesting assembly that includes a coil 76 that is interconnected with the body 48 of the joint 26, and a magnet 78 that is interconnected with the bearing cap 62 of at least one of the joints 26, for rotating with the joint 26 for generating electricity. The magnet 78 and the coil 76 are electrically connected with the sensor assembly 38 for providing electric power to the sensor assembly 38. It should be appreciated that the coil 76 could alternatively be placed on any of the input or output trunnions 58, 60 and the magnet 78 could alternatively be positioned on the trunnion yoke 33.

In one aspect, using a universal Cardan joint 28, the output shall 34 does not operate at constant velocity but rather has a periodic velocity that is twice the frequency of the input shaft 32 rotational speed. The trunnions 58, 60 move cyclically relative to the bearing cap 62 at twice the frequency of the input shaft 32. This relative motion, which occurs even with a constant input shaft 32 velocity, provides for an ideal source of inductive charging for supplying current to the sensor assembly 38 and/or a power storage cell. The magnets 78 mounted on the bearing caps 62 or trunnion yoke provide a static reference point relative to the motion of the body 48 for inductive power generation which can then be used to continuously power the sensor or supply energy to a charge storage device. Analogue to Digital (A-D) monitoring of the inductive signal can further provide a clocking and triggering source for spatially-resolved A-D torque acquisitions and speed sensing. Motion of the body 48 alone can be used as an inertially dynamic source for inductive and piezo-electric harvesting without the need for a relative static mounting location on the bearing cap 62 or trunnion yoke 33. Similarly, motion of the output shaft 34 (or the body 48 of a double Cardan universal joint 30) can provide an inertially dynamic energy source, as the output shaft 34 of a u-joint experiences two acceleration/deceleration cycles for each rotational cycle of the input shaft 32 of the joint 26.

Figure 12:
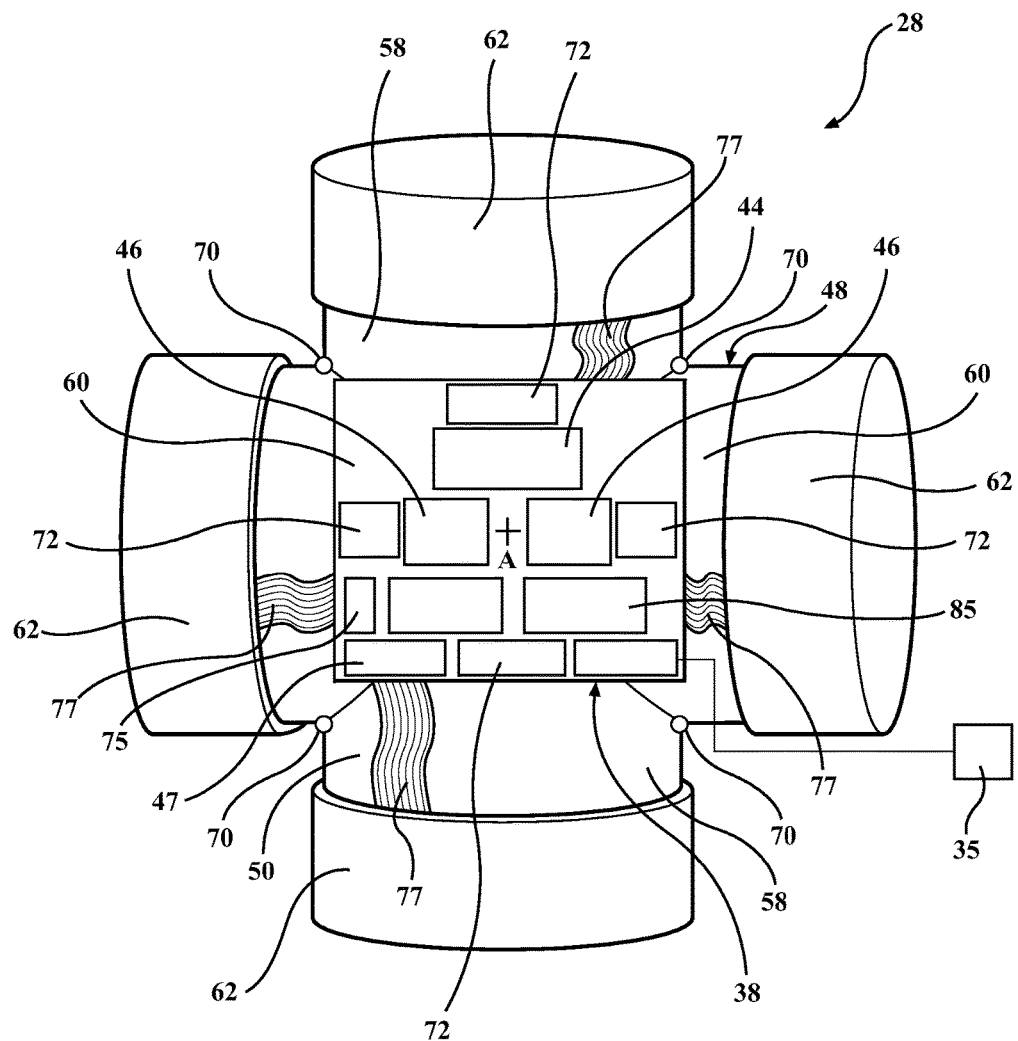
FIG. 12 is a side view and schematic of a universal Cardan joint and a schematic of the sensor assembly in accordance with an aspect of the present disclosure.

In another aspect of the disclosure, as best presented in FIG. 12, the energy harvesting assembly 74 is a piezoelectric harvesting assembly that includes a piezoelectric flexible membrane 77 made of a ceramic material or a polymeric material and is interconnected with the joint 26 for deflecting in response to movement of the joint 26 to produce electricity. The energy harvesting assembly 74 further includes a charge management device 85 which is electrically connected with the piezoelectric flexible membrane 77 fix receiving electricity from the piezoelectric flexible membrane. The charge management device 84 is electrically connected with the sensor assembly 38 for providing electric power to the sensor assembly 38. The piezoelectric flexible membrane 77 can be tuned with an external mass to deflect at resonant frequencies at or near the typical operational frequencies of the rotating shaft. Deflection of the polymer portion of the piezoelectric flexible membrane 77 as a result of the oscillations creates a charge field which can be rectified and stored as electrical energy using a charge management device. The harvested energy may supply a portion of the required current needed to operate the sensors, thus, extending the duration between battery 42 charges, or may even supplement the entire load requirement, thus, enabling indefinite operation of the sensor assembly 38.

The remote system is equipped with a battery monitoring circuitry 39 as well as detection circuitry 41 of active harvesting to enable intelligent charge management and circuit activation upon obtaining adequate energy storage.

In another aspect of the disclosure, the energy harvesting assembly 74 is a peltier harvesting assembly which includes a bi-directional peltier controller which is interconnected with the joint 26 for generating electricity. The peltier controller is electrically connected with the sensor assembly 38 for providing electric power to the sensor assembly 38. Thermal energy generated within the joint 26 is another viable energy harvesting source by using a Peltier device. With a bi-directional Peltier controller (Le gradients in either direction can be harvested) a single 10 mm square Peltier controller has demonstrated the ability to produce adequate charge current to power our integrated sensor device at transmission rates up to 100 Hz with no more than a SC temperature difference between the rotating shaft and ambient air. Higher temperature differences can support higher transmission rates. A universal joint 26 is unique in that it generates heat as a result of its motion. In an aspect, needle bearings within the bearing cap 62 generate frictional heat as they roll within a viscous lubricant transferring load between the bearing cap 62 and trunnion. The slightest increase in temperature between the u-joint and ambient can provide the necessary thermal gradient to power the device. Even when the shaft is inactive, diurnal changes in temperature continuously warm and cool the thermal mass of the rotating device providing a continuously varying gradient for thermal-electric battery 42 charging. The unique aspect of this charging technique is that power harvesting is not dependent on motion and can occur even when the shaft is not in use. A combined strategy (i.e., thermal-gradient and motion-based) provides a robust charging and supply system that assure functionality over a long operational life.

In another alternative aspect, the energy harvesting system 74 may include an inductive ring (not shown) for generating energy from the rotating component to provide power to the sensor assembly.

While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing aspects may be combined to form further examples of the disclosure.

What is claimed is:

1. An assembly for acquiring operational data from a machine including a power generating device and a rotating component interconnected with the power generating device for transmitting power from the power generating device, comprising:
    a sensor assembly having a sensor interconnected to the rotating component for sensing operational data of the machine and a microprocessor communicatively connected to the sensor for receiving and interpreting the operational data sensed by the sensor; and
    further including an energy harvesting assembly interconnected with the rotating component for rotation with the rotating component to harvest energy from the rotating component, and interconnected with the sensor assembly to provide power to the sensor assembly.

2. The assembly of claim 1, wherein the operational data is at least one of speed, horsepower, rotational position, torque, acceleration, temperature, pressure, and strain of the rotating component of the machine.

3. The assembly of claim 1, wherein the rotating component is at least one of a driveshaft, a driveshaft yoke, a Cardan universal joint, a double Cardan universal joint, a transmission joint, a gear, a half shaft, and a prop shaft.

4. The assembly of claim 1, wherein the sensor is at least one of an infrared (IR) proximity sensor, a magnetometer, an accelerometer, a gyroscope, and a proximity sensor.

5. The assembly of claim 1, further including a transceiver base unit being interconnected with the power generating device, wherein the transceiver base unit is in wireless communication with the sensor assembly and wherein the transceiver base unit receives the operational data from the sensor assembly and sends instructions to the sensor assembly to change a mode of operation of the sensor assembly.

6. The assembly of claim 5, further including a remote transceiver being in wireless communication with the transceiver base unit, wherein the remote transceiver transmits data to the transceiver base unit.

7. The assembly of claim 1, wherein the energy harvesting assembly is an inductive harvesting assembly having a coil and a magnet interconnected with the rotating component for rotation with the rotating component for generating electricity, and wherein the coil and the magnet are electrically connected with the sensor assembly for providing power to the sensor assembly.

8. An assembly for acquiring operational data from a machine including a power generating device and a rotating component interconnected with the power generating device for transmitting power from the power generating device, comprising:
    a sensor assembly having a sensor interconnected to the rotating component, the sensor senses operational data of the machine and a microprocessor communicatively connected to the sensor, the microprocessor receives and interprets the operational data sensed by the sensor;
    wherein the rotating component includes a joint and wherein the operational data of the machine includes at least one of speed, horsepower, rotational position, torque, acceleration, temperature, pressure, and strain of the joint of the machine; and
    further including an energy harvesting assembly interconnected with the joint for rotation with the joint to harvest energy from the rotating component, and interconnected with the sensor assembly to provide power to the sensor assembly.

9. The assembly of claim 8, wherein the sensor is an infrared proximity sensor for measuring rotational position of the joint.

10. The assembly of claim 8, wherein the sensor assembly includes at least one temperature sensor for measuring temperature of the joint.

11. The assembly of claim 8, wherein the sensor assembly includes at least one pressure sensor for measuring fluid pressure adjacent to the joint.

12. The assembly of claim 8, wherein the sensor assembly includes at least one strain gauge for detecting strain on the joint.

13. The assembly of claim 8, wherein the sensor assembly includes at least one global positioning sensor for collecting speed and location data of the machine.

14. The assembly of claim 8, wherein the joint is one of a Cardan universal joint and a double Cardan universal joint.

15. The assembly of claim 8, wherein the energy harvesting assembly is an inductive harvesting assembly having a coil and a magnet interconnected with the joint for rotation with the joint for generating electricity, and wherein the coil and the magnet are electrically connected with the sensor assembly for providing power to the sensor assembly.

16. An assembly for acquiring operational data from a machine including a power generating device and a rotating component interconnected with the power generating device for transmitting power from the power generating device, comprising:
    a sensor assembly interconnected with the rotating component for sensing the operational data of the machine;
    wherein the sensor assembly includes a microprocessor for receiving and interpreting the operational data,
    wherein the sensor assembly includes at least one infrared (IR) proximity sensor for measuring rotational speed of the rotating component,
    wherein the sensor assembly includes at least one temperature sensor for measuring temperature of the rotating component,
    wherein the sensor assembly includes at least one pressure sensor for measuring fluid pressure adjacent to the rotating component,
    wherein the sensor assembly includes at least one strain gauge for detecting strain on the rotating component; and
    further including an energy harvesting assembly interconnected with the rotating component for rotation with the rotating component to harvest energy from the rotating component, and interconnected with the sensor assembly to provide power to the sensor assembly.

17. The assembly of claim 16, further including:
    a transceiver base unit being interconnected with the power generating device, and
    a remote transceiver being in wireless communication with the transceiver base unit, wherein the remote transceiver transmits data to the transceiver base unit and the transceiver base unit receives the operational data from remote transceiver and sends instructions to the sensor assembly to change a mode of operation of the sensory assembly.

18. The assembly of claim 16, further including:
a battery interconnected with the rotating component, the energy harvesting assembly and the sensor assembly for powering the sensor assembly.

19. The assembly of claim 16, wherein the energy harvesting assembly is an inductive harvesting assembly having a coil interconnected with the rotating component and a magnet interconnected with the rotating component for rotating with the rotating component for generating electricity, and wherein the coil and the magnet are electrically connected with the sensor assembly for providing power to the sensor assembly.

20. The assembly of claim 16, wherein the rotating component is one of a driveshaft, a driveshaft yoke, a Cardan universal joint, a double Cardan universal joint, and a transmission joint.

21. The assembly of claim 16, wherein the power generating device is an engine and the machine is a vehicle.

* * * * *